United States Patent [19]

Fisher

[11] Patent Number: 4,650,440
[45] Date of Patent: Mar. 17, 1987

[54] LUBRICATION OF HOOKES UNIVERSAL JOINTS

[75] Inventor: Leslie G. Fisher, Birmingham, England

[73] Assignee: BRD Company Limited, Walsall, England

[21] Appl. No.: 793,693

[22] PCT Filed: Mar. 25, 1985

[86] PCT No.: PCT/GB85/00112
§ 371 Date: Oct. 18, 1985
§ 102(e) Date: Oct. 18, 1985

[87] PCT Pub. No.: WO85/04458
PCT Pub. Date: Oct. 10, 1985

[30] Foreign Application Priority Data
Mar. 24, 1984 [GB] United Kingdom ............... 8407723
Mar. 29, 1984 [GB] United Kingdom ............... 8408053

[51] Int. Cl.⁴ ............................................. F16D 3/41
[52] U.S. Cl. ...................................... 464/14; 384/473; 464/131
[58] Field of Search .............. 184/109; 277/15, 68; 384/368, 373, 374, 425, 466, 473; 464/11, 14, 131

[56] References Cited
U.S. PATENT DOCUMENTS 1,841,349  1/1932  Culbertson ................. 464/14 X
2,024,410 12/1935  Williams ....................... 464/14
3,635,535  1/1972  Schultenkamper ......... 464/14 X
3,832,865  9/1974  Lewis .............................. 464/14
4,478,591 10/1984  Mangiavacchi ............... 464/14

FOREIGN PATENT DOCUMENTS
1278541 10/1961 France .
2437524  4/1980 France .
1170214 11/1969 United Kingdom .
1477910  6/1977 United Kingdom .

Primary Examiner—Stuart S. Levy
Assistant Examiner—Daniel P. Stodola
Attorney, Agent, or Firm—Marshall, O'Toole, Gerstein, Murray & Bicknell

[57] ABSTRACT

A Hookes universal joint wherein each journal of the cross member of the joint has a lubricant chamber adjacent its outermost end, and the lubricant channel for the journal leads into a passage extending outwardly towards the free end of the journal and then inwardly to open into the chamber at its innermost end. The passage is defined by a one piece component which includes a spigot extending into lubricant channel, an outwardly extending tube, and inwardly extending tubes which terminate at the innermost end of chamber. These parts are formed in a one piece component integral with a thrust washer. The arrangement prevents lubricant drainage from the chamber when the joint is stationary.

7 Claims, 3 Drawing Figures

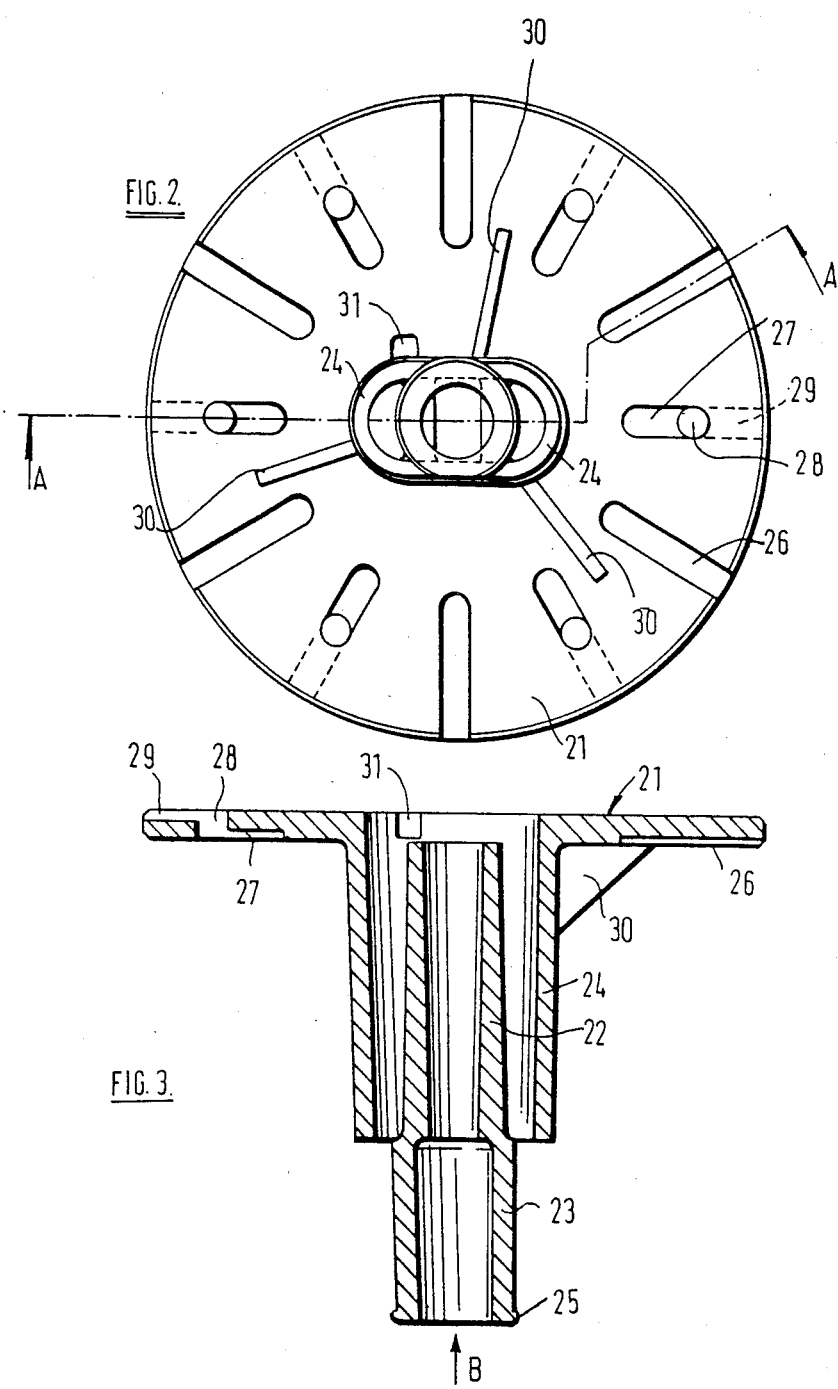

LUBRICATION OF HOOKES UNIVERSAL JOINTS

This invention relates to universal joints of the Hookes type, which comprise two yokes, connected by a cross member having journals supported in bearing cups held in the yokes. More particularly, the invention relates to a Hookes joint wherein the journals of the cross member of the joint are provided with internal lubricant channels which open at the ends of the journals to provide for replenishment of lubricant in the bearing cups within which the journals are pivotedly supported in the respective yoke members of the joint. At their innermost ends, the lubricant channels intersect and communicate with a lubrication fitting, usually a grease nipple, through which lubricant can be introduced when required.

It is to be understood that when we refer to inner and outer positions or directions with regard to the journals of the cross member of the joint, we mean the radial directions having regard to the axis of rotation of the cross member as a whole, when the joint is in use in the aligned (non-articulated) condition.

When fresh lubricant is introduced to the cross member of the universal joint, it moves under the pressure of its injection, through the channels and, at the end of the journals, passes over the end faces thereof to lubricate the bearing surfaces, which usually include needle roller bearings, between the journal side wall and bearing cup. Such outward dispersal of lubricant is assisted by centrifugal force in use of the joint.

However, if the joint comes to rest in the state where one of the journals is in a vertical position, it is possible for the lubricant, particularly if it is excessively fluid due to temperature, to drain from the journal in question. When the joint is restarted, the journal may not be satisfactorily lubricated.

It has been proposed, in GB-PS No. 1170214, to incorporate a non-return valve in each lubricant channel to overcome this problem. However, such non-return valves add complexity to the joint and have certain other disadvantages. For example, if one of the non-return valves should require a higher pressure to open it to permit outward flow of lubricant than is required by the other valves, the journal having the non-return valve may not be properly lubricated.

It is the object of the present invention to overcome the potential problem of lubricant drainage, while avoiding such disadvantages of non-return valves as proposed hitherto.

According to the present invention, we provide a Hookes universal joint comprising two yokes connected by a cross member having journals supported in bearing cups held in the yokes, each journal having a lubricant channel extending therethrough, wherein each journal of the cross member is provided adjacent its outermost end with a chamber for lubricant, and each lubricant channel leads into a passage extending outwardly towards the outermost end of the journal and then inwardly to open into said chamber adjacent to the innermost end thereof.

When such a Hookes joint is stationary, lubricant in the chamber of a vertically disposed journal cannot drain therefrom because it cannot travel up the passage against gravity, as it would have to do in order to reach the lubricant channel. The arrangement acts in the manner of a weir, to retain the lubricant in the chamber. The arrangement does not, however, have the disadvantages attendant on one way valves, as described above.

The passage may comprise a first portion which extends outwardly from said lubricant channel, and terminates adjacent the outermost end of the journal, and a second portion in communication with the outermost end of the first portion and terminating adjacent the innermost end of the chamber. The first and second passage portions may be provided in a single component disposed in the chamber, which component conveniently may be a moulding of a plastics material.

Preferably, the component which provides the passage includes a spigot which extends into the lubricant channel in the journal, and engages the latter, by being a sufficient tight fit, to hold the component to the journal. This facilitates handling of the parts of the joint during assembly thereof. The component may include a portion which acts as a thrust washer for an end surface of the journal, eliminating the need for a separate thrust washer component and thus further economising and simplifying assembly of the joint.

The component may include a formation which establishes communication between the passage defined thereby, and the chamber adjacent the outermost end of the journal, to prevent syphoning of lubricant from the chamber.

These and other features of the invention will now be described by way of example with reference to the accompanying drawings, of which:

FIG. 2 is a view, in the direction of arrow B of FIG. 3, of part of the joint.

FIG. 3 is a section, on the line A—A of FIG. 2, of the joint part.

Figure 1:
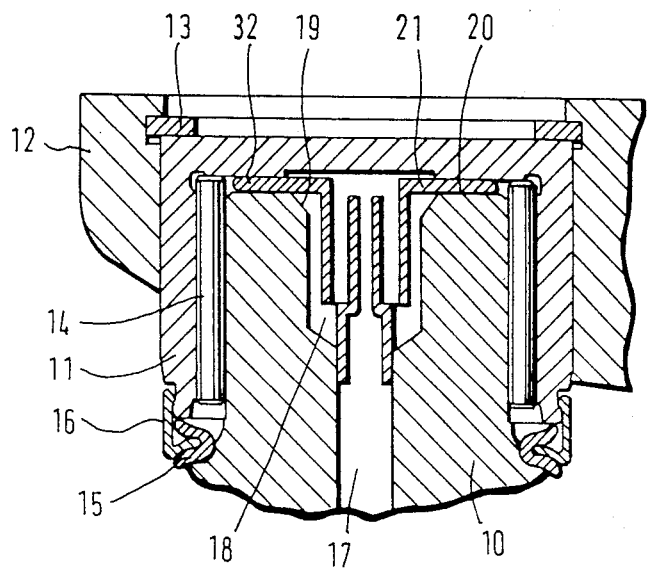
FIG. 1 is a section through one journal and associated parts of a Hookes joint according to the invention.

Referring firstly to FIG. 1 of the drawings, the part of the Hookes joint there illustrated comprises a journal 10, one of four such journals of the cross member of the joint. The journal is received in a bearing cup 11 which is retained in a limb 12 of a joint yoke by a circlip 13. Needle roller bearings 14 are received between the outer circumferential surface of the journal 10 and the inner circumferential side wall of the bearing cup 11. An annular seal 15, in a carrier 16, retains lubricant and excludes dirt from the inside of the bearing cup. However, the engagement between carrier 16 and the bearing cup is that when fresh lubricant is introduced into the bearing cup as described hereafter, excess such lubricant can escape.

A lubricant channel 17 extends through the journal 10. The lubricant channels of the four journals of the cross member intersect at or adjacent the centre of the cross member, where there would be provided a grease nipple or like fitting to enable fresh lubricant to be supplied to the cross member when required. Adjacent the outermost end of the journal 10, the channel 17 widens to form a chamber 18, from which a frustoconical surface 19 leads to the outwardly facing end surface 20 of the journal. A thrust washer element 21 is interposed between the end face 20 of the journal and the end wall 32 of the bearing cup.

The thrust washer element 21 forms part of a component which is shown in greater detail in FIGS. 2 and 3 of the drawings. This component comprises, in addition to the thrust washer element 21, a structure which extends inwardly in the assembled joint and has a central tube 22 which terminates at its outermost end adjacent the thrust washer element 21 and at its innermost end in a spigot 23. The central tube 22 is flanked by two further tubes 24, which extend inwardly from the thrust washer element 21 to terminate, in the assembled joint, adjacent the innermost end of chamber 18. The diameter of spigot 23 is such that it is a press fit within the channel 17, and the spigot has an annular formation 25 at its end to ensure as far as possible that its engagement with the channel 17 is fluid tight.

The thrust washer element 21 has an inner annular region whose surfaces are flat. Beyond this region, the thrust washer has shallow grooves formed in its surface, some of which, as shown at 26, extend on one surface only of the thrust washer. Other grooves 27 on the same side of the thrust washer as grooves 26 communicate, by apertures 28, with grooves 29 on the other side of the thrust washer. There are further provided three spaced webs 30 of triangular shape, extending between the thrust washer element 21 and the structure 22, 24 integral therewith. There is also a formation 31 in the form of a hole, establishing communication between the chamber 18 and the space adjacent the outermost end of tube 22. This hole is small, with an area of the order of, for example, 5% of the area of tubes 24.

When installed in a universal joint, as shown in FIG. 1, the component of FIGS. 2 and 3 has its spigot 23 received in lubricant channel 17 in journal 10. Lubricant from channel 17 is thus constrained to travel outwardly to the free end of tube 22, and thereafter inwardly to the innermost ends of tubes 24. No lubricant reaches grooves 29 directly from the outermost end of tube 22, because there is flat face-to-face engagement between the end wall 22 of the bearing cup and the annular ungrooved portion of the thrust washer 21. From chamber 18, lubricant travels by way of grooves 26, 27, 29 to reach the needle roller bearings 14. Very little lubricant reaches chamber 18 directly through hole 31, because of the small area of such hole compared with tubes 24.

Webs 30 engage frustoconical surface 19 of the journal to ensure that the thrust washer is centred relative to the journal.

If a universal joint according to the invention comes to rest with one journal pointing upwardly, as shown in FIG. 1, it will be appreciated that lubricant cannot drain from the chamber 18 down the channel 17. The arrangement of tube 22 and spigot 23 prevents this. Hole 31 provides a vent to prevent any tendency for lubricant to syphon from chamber 18 to channel 17. Further, when fresh lubricant is added by way of channel 17, tubes 24 ensure that chamber 18 is filled from its innermost end outwardly, driving any air, which may be present, out of the system. The invention thus solves the problem of lubricant drainage, while overcoming the disadvantages above referred to of one way valves as proposed hitherto. Further advantages are that if the joint is dismantled, the component, including thrust washer 21 remains attached to the journal 10 (by virtue of the engagement of spigot 23 within channel 17) and is not likely to be misplaced. The component is readily manufactured and assembled in a universal joint as conventional thrust washers have been hitherto, without undesirable increase in expense of manufacture.

I claim:

1. In an assembly comprising a journal of a cross member of a Hookes universal joint supported in a bearing cup held in a yoke of the joint, the journal having a lubricant channel extending therethrough and being provided adjacent its outermost end with a chamber for lubricant, the improvement wherein a component is disposed in said chamber, said component comprising a first portion defining a passage for lubricant extending outwardly from said lubricant channel towards the outermost end of the journal and terminating adjacent said outermost end, and a second portion defining a passage for lubricant extending inwardly from a position adjacent and in communication with the end of said first portion and terminating adjacent the innermost end of said chamber.

2. The improvement according to claim 1 wherein there are provided a plurality of said second passage-defining portions.

3. The improvement according to claim 1 wherein said component is a moulding of a plastic material.

4. The improvement according to claim 1 wherein said component includes a spigot which extends into said lubricant channel and engages the latter to hold the component to the journal.

5. A joint according to claim 1 wherein said component includes a portion which acts as a thrust washer for an end surface of the journal.

6. A joint according to claim 5 wherein said thrust washer portion includes surface grooves for distribution of lubricant.

7. A joint according to claim 1 further comprising a formation establishing communication between said passage and chamber adjacent the outermost end of the journal to prevent syphoning of lubricant from said chamber.

* * * * *